C. O. BLAUEL.
WAVE MOTOR.
APPLICATION FILED MAR. 2, 1909.

947,321.

Patented Jan. 25, 1910.

3 SHEETS—SHEET 1.

Witnesses:
Arthur E. Zumpe
W. R. Schulz

Inventor:
Carl Otto Blauel
By Hauff & Briesen Atty.

C. O. BLAUEL.
WAVE MOTOR.
APPLICATION FILED MAR. 2, 1909.

947,321.

Patented Jan. 25, 1910.

3 SHEETS—SHEET 2.

Witnesses:
Arthur E. Juniper
N. P. Schulz

Inventor:
Carl Otto Blauel
by Frank T. Brieson Att'y

C. O. BLAUEL.
WAVE MOTOR.
APPLICATION FILED MAR. 2, 1909.

947,321.

Patented Jan. 25, 1910.

3 SHEETS—SHEET 3.

Witnesses:
Arthur E. Zumpe
W. R. Schulz

Inventor:
Carl Otto Blauel
by Hans v. Briesen Att'y

UNITED STATES PATENT OFFICE.

CARL OTTO BLAUEL, OF DUSSELDORF-OBERCASSEL, GERMANY.

WAVE-MOTOR.

947,321. Specification of Letters Patent. Patented Jan. 25, 1910.

Application filed March 2, 1909. Serial No. 480,949.

*To all whom it may concern:*

Be it known that I, CARL OTTO BLAUEL, engineer, a citizen of the German Empire, residing at Barbarossaplatz No. 1, Dusseldorf-Obercassel, in the Province of Rhineland, Prussia, Germany, have invented new and useful Improvements in Wave-Motors, of which the following is a specification.

The present invention has for its object a contrivance serving for taking advantage of the power of the sea-waves, comprising one or several basins to be adapted to the masonry of quays or to the walls of boats or to similar hold-backs, such basins being open at the bottom, adjustable in level and connected by means of pipings, furnished with back pressure valves or adequate regulating devices, with an air overcharge vessel and in given cases with an air undercharge vessel for feeding turbines or other pneumatic power engines.

The essential feature of the object of the invention lies in the fact, that two valves or shut-off members coöperate in such a way that one of same opens itself before the water, having entered the basin, lowers, allowing in this manner the compressed air, still contained in the basin, to pass out, by which means the descending water can directly exert a sucking effect, while the second valve is opened in case the wave does not fall below the basin hereinabove referred to.

Figure 1:
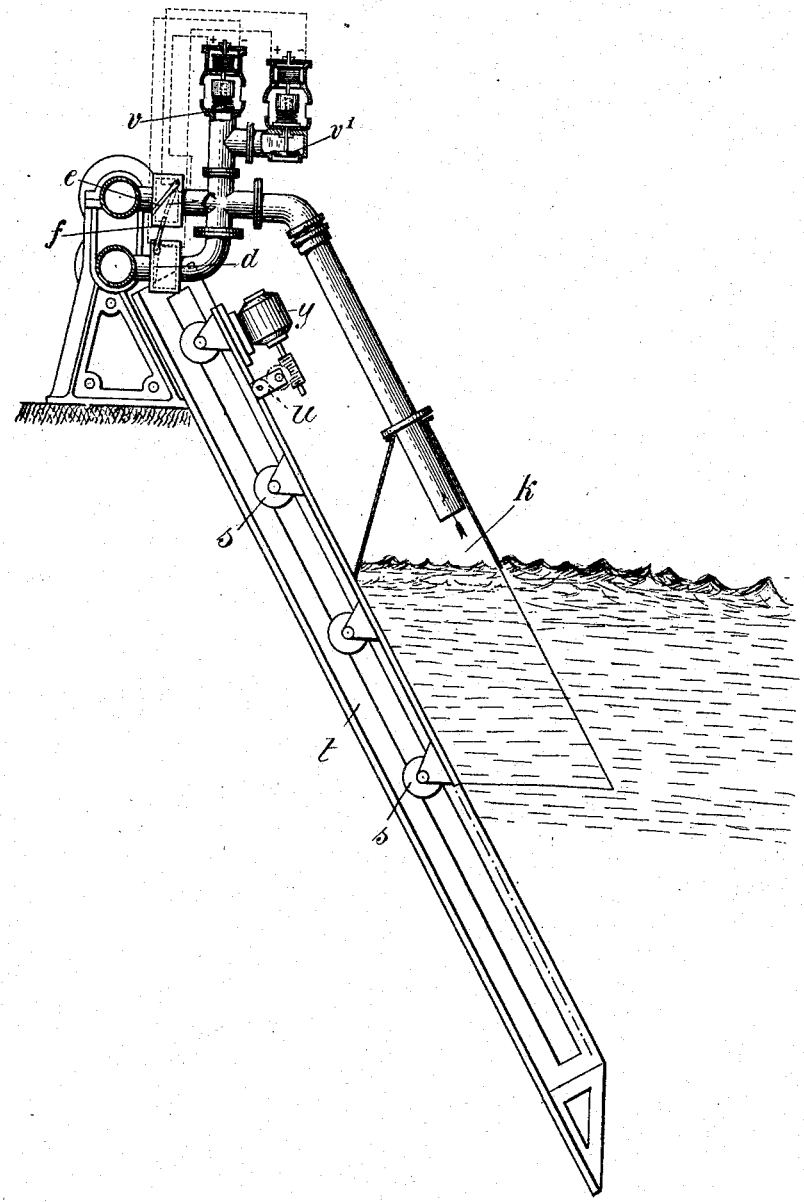
Figure 2:
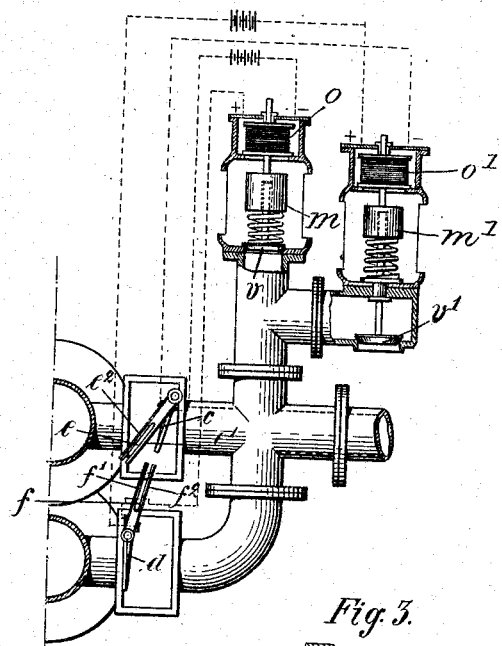
Figure 6:
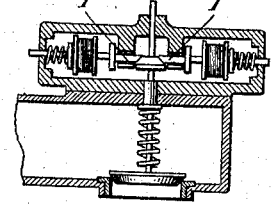
Figure 3:
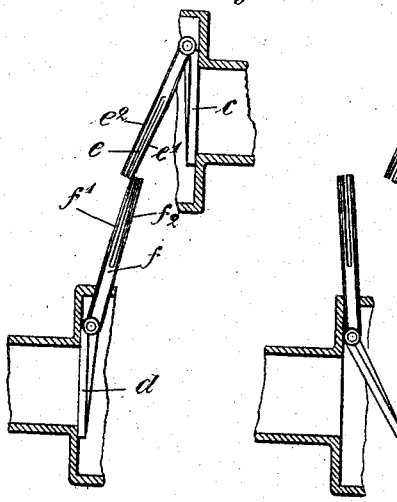
Figure 4:
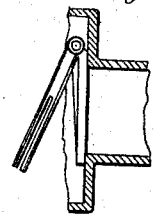
Figure 5:
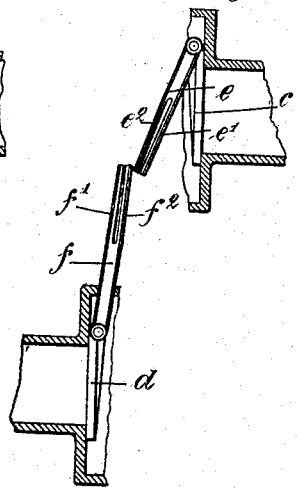
Figure 7:
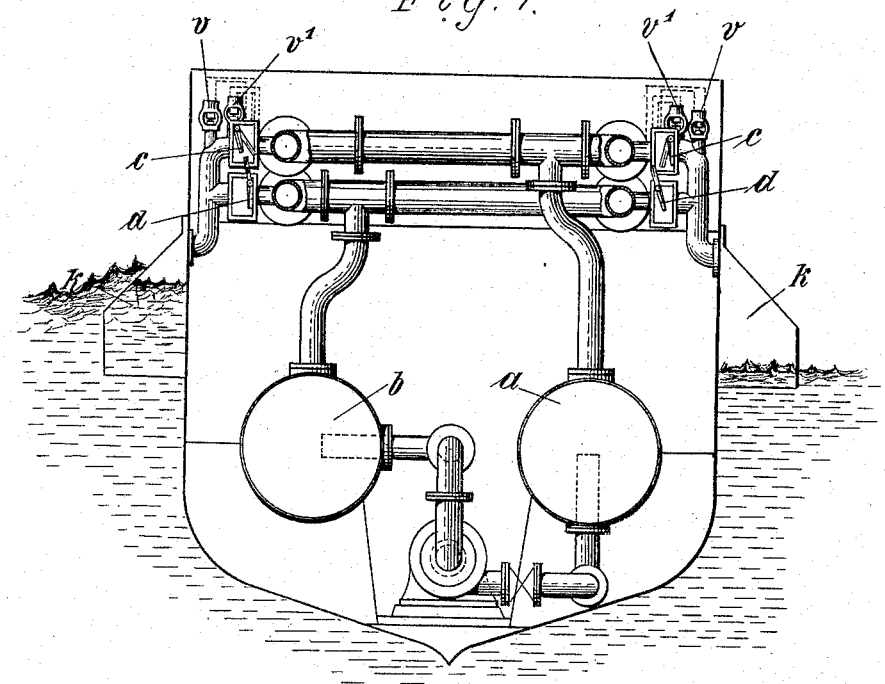
Figure 8:
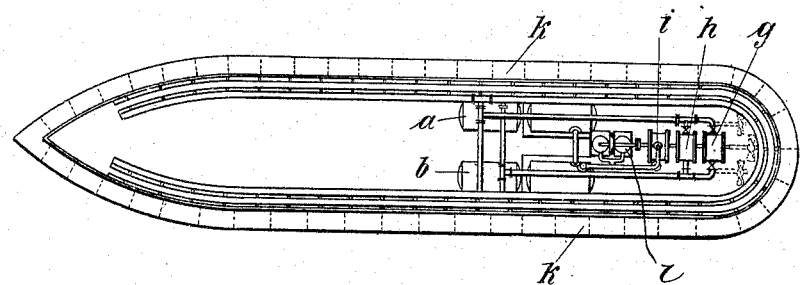

In the accompanying figures, in which similar letters refer to similar parts throughout the several views, the new contrivance is represented in two forms of embodiment, and Figure 1 shows in side view and partial section the contrivance adapted to the masonry of a quay, whereas Fig. 2 demonstrates on a somewhat larger scale the arrangement of the valves and the flaps actuating the valves and placed in the suction- and pressure piping. The Figs. 3 to 5 are illustrative of the further positions of the shut-off flaps and of the contact-levers connected with these. Fig. 6 is a special form of embodiment of a valve-arrangement. The Figs. 7 and 8 show the contrivance in combination with a boat.

The letter $k$, indicates a basin adjustably secured to a quay wall or ship body, said basin being provided with a closed tapering top and with an open bottom. For vertically adjusting basin $k$, the latter is mounted upon wheels $s$, engaging a rail $l$, and has a rack into which meshes a pinion $u$, operatively connected to an electro-motor $y$. When the sea waves are entering the basin, they compress the air contained in it, and this is conducted by means of a piping, after having passed the non-return flap $c$, to an air overcharge-vessel $a$, and when the water in the basin sinks again, it has a sucking and air-rarefactive effect; owing to this the flap $c$ is closed and the flap $d$ is opened, by which means the rarefaction of the air imparts itself to the tank $b$.

The tank $a$ is in conjunction with the delivery pipe and the tank $b$ is connected with the waste-pipe of a pneumatic turbine or with that of another pneumatic machine. In order now to compensate the pressure of the atmospheric air before the water lowers again in the basins and to obtain rapidly the air-rarefactive effect when the sinking of the water takes place, and further for doing away with the air-undercharge, in case the water does not sink below the bottom of the basin, automatically governed valves $v$, $v'$ are employed, which, however, may be supplanted by slide valves, cocks or similar devices. The governing of the valves may be effected in any form whatever.

In the plant represented in the drawing and more particularly in its Fig. 2, it takes place on one hand by the electric current and on the other hand by means of a weight, adapted to slide upon the valve-stem. The two flaps of the back pressure valves are fitted with contact-levers $e$—$f$ and these are shaped in such a way that both the valve $v$ and the valve $v'$ are governed. The contact-levers are furcated at their ends and spring-actuated and both carry separate contact-slips $e'$, $e^2$ and $f'$, $f^2$, connected with the magnets $o$, $o'$, of the valves $v$, $v'$.

In Fig. 2 the position is shown in which the water is rising in the basin $k$; consequently the flap $c$ is opened and the air in the collecting vessel is compressed. During this operation the contact-lever $e$ is moved lengthwise the contact-lever $f$ in left-hand upward direction, so that consequently the magnets of the valves $v$ and $v'$ are without current and the valves are locked in position by means of the weights $m$, $m'$. In the position, as shown in Fig. 3, the wave is about to lower, and consequently the flap $c$ has closed itself and the contact-arm with its contact-slip $e'$ is bearing against the contact-slip $f'$ of the arm $f$. By this means contacts are established in the piping, leading to the magnet of the valve $v$, so as to raise up the weight and balance the valve $v$; this valve can now be opened due to the overcharge prevailing in the basin $k$ and consequently a balancing of the pressure takes place. After the balancing of the pressure has been effected, the valve closes itself automatically by its own weight; it is, however, no sooner charged again, until undercharge supervenes owing to the sinking of the water and, resulting therefrom, the flap $d$ opens itself. When this is being opened, the contact-arm $f$ passes lengthwise the contact-arm $e$ and moves in left hand downward direction into the position shown in Fig. 4. The contact is interrupted and the valve $v$ is charged again by the load. Air is now sucked up from the undercharge-vessel until the wave ceases sinking or until it moves under the vessel $k$. In these cases the flap $d$ closes itself again and the contact-face $f^2$ of the contact-arm $f$ enters in conjunction with the contact-face $e^2$ of the arm $e$, as is shown in Fig. 5. Owing to this, the current is led to the magnet of the valve $v'$ and this is balanced. When the wave has fallen below the basin $k$ air is allowed to come into this from underneath, and consequently the valve $v'$ opens itself but slightly or not at all. If, on the other hand, the water does not fall below the basin, the valve $v'$ is opened by the overcharge prevailing outside and a compensation of the pressure is effected by the incoming air after which the valve is automatically closed by its own weight.

As soon as the wave rises again and the air is compressed in the basin $k$, the flap $c$ opens itself and the contact-arm $e$ moves again into the position shown in Fig. 2. The load charging $v'$ falls off when the contact is released and $v'$ is closed in position again.

Instead of charging the valves by loads, they may also be locked in position by means of bolts $r$ as is shown in Fig. 6. The bolts are tapering at their ends and embrace collars of the valve-spindles. The bolts are made to pass apertures of solenoids which, when the current is closed, attract the bolts, detracting same from the collars of the valve-spindles.

Several basins $k$ may be arranged in juxtaposition; as a rule, the waves do not operate said basins simultaneously but consecutively, so that a uniform action of the device is obtained. For the purpose of allowing, however, a continuous and uniform service, even though the dashing of the waves be only a slight one, the described force producing plant may be connected to a steam-power plant, and a suitable combination, which I have designed for the purpose, is illustrated in Fig. 8.

In the given arrangement two pneumatic turbines $g$ and $h$ for high and low atmospheric pressure and likewise a steam-turbine $i$ and a small-size piston steam-engine $l$ are provided, which all collectively operate on a common shaft. If, e. g., a vehement dashing of the waves and consequently a high atmospheric pressure prevails in the piping, the same is led into the pneumatic turbine $g$ designed for higher pressure, in which arrangement the other pneumatic turbine is put out of action by means of a cut-off member, while the steam is conducted to the piston steam engine $l$. When, on the other hand, the dashing of the waves and consequently the atmospheric pressure are but slight, the turbine $g$ and the piston steam-engine are put out of action and the turbine $h$ and the steam-turbine $i$ are connected up. When the dashing of the waves is exceedingly vehement, also both pneumatic turbines and when such dashing is null or but a slight one, the steam-turbine and piston steam-engine may be connected up simultaneously.

I claim:—

1. A wave motor for effecting an over pressure and under pressure of air and comprising a basin accessible to the waves, means for discharging the compressed air contained in the basin at the beginning of the wave-recession, and means for admitting air to the basin and for removing the under pressure at the beginning of the wave-rise, whereby the recession of the waves causes an instantaneous suction, while the rising of the waves causes an instantaneous air compression.

2. A wave motor for effecting an over pressure and under pressure of air and comprising a basin accessible to the waves, an air motor operable thereby, and pressure equalizing valves adapted to connect said basin with the outer air.

3. A wave motor comprising an adjustable basin having an open lower end, a pipe communicating with the top of the basin, an overpressure tank, an underpressure tank, back pressure valves controlling communication between the basin and said tanks, and pressure compensating valves controlled by the back pressure valves.

4. A wave motor comprising an adjustable basin having an open lower end, a pipe communicating with the top of the basin, an overpressure tank, an underpressure tank, back pressure valves controlling communication between the basin and said tanks, pressure compensating valves connected to the pipe, and electric means controlled by the back pressure valves for actuating the compensating valves.

5. A wave motor comprising an adjustable basin having an open lower end, a pipe communicating with the top of the basin, an overpressure tank, an underpressure tank, back pressure valves having contact-arms and controlling communication between the basin and said tanks, pressure compensating valves connected to the pipe, and electric circuits adapted to be closed by the contact-arms for actuating the compensating valves.

Signed by me at Barmen, Germany, this 13th day of February 1909.

CARL OTTO BLAUEL. [L. S.]

Witnesses:
OTTO KÖNIG,
WILLY KLEIN.